United States Patent [19]

Camp, Jr.

[11] Patent Number: 5,072,076
[45] Date of Patent: Dec. 10, 1991

[54] TABLET DIGITIZER WITH UNTETHERED STYLUS

[75] Inventor: William O. Camp, Jr., Ithaca, N.Y.
[73] Assignee: International Business Machines Corporation, Armonk, N.Y.
[21] Appl. No.: 640,764
[22] Filed: Jan. 14, 1991
[51] Int. Cl.$^5$ ............................................. G08C 21/00
[52] U.S. Cl. .................................... 178/18; 178/20; 310/319; 310/339
[58] Field of Search ............................... 178/18, 19, 20; 310/319, 359, 366

[56] References Cited

U.S. PATENT DOCUMENTS

| | | | |
|---|---|---|---|
| 3,591,718 | 7/1971 | Asano et al. | 178/19 |
| 3,904,822 | 9/1975 | Kamm et al. | 178/19 |
| 3,940,637 | 2/1976 | Ohigashi et al. | 310/339 |
| 4,080,515 | 3/1978 | Anderson | 178/19 |
| 4,633,123 | 12/1986 | Radice | 310/339 |
| 4,644,101 | 2/1987 | Jin et al. | 178/18 |
| 4,672,154 | 6/1987 | Rodgers et al. | 178/19 |
| 4,731,508 | 3/1988 | Gibson et al. | 178/18 |
| 4,752,655 | 6/1988 | Tajiri et al. | 178/18 |
| 4,758,691 | 7/1988 | De Bruyne | 178/19 |
| 4,806,918 | 2/1989 | Berke et al. | 340/12 |
| 4,818,826 | 4/1989 | Kimura | 178/19 |
| 4,929,934 | 5/1990 | Ueda et al. | 340/706 |
| 4,934,470 | 6/1990 | Berthold et al. | 178/18 |
| 4,947,156 | 8/1990 | Sato et al. | 340/707 |

OTHER PUBLICATIONS

IBM TDB, vol. 30, No. 3, 8/1987, "Check Pad for Personal Computer", E. Khorasani et al.
IBM TDB, vol. 31, No. 7, 12/88, "Personal Identification Terminal", J. A. Dickerson et al.
IBM TDB, vol. 28, No. 9, 2/1986, "Cursor Controller/Graphics Aid", B. J. Connors et al.
IBM TDB, vol. 19, No. 6, 11/76, "Manual Character Entry Device", K. H. Borchardt et al.
IBM TDB, vol. 29, No. 8, 1/87, "Three-Axis Touch-Sensitive Pad", J. W. Cannon et al.

Primary Examiner—Stafford D. Schreyer
Attorney, Agent, or Firm—Lynn L. Augspurger

[57] ABSTRACT

A Prior Art current digitizer which uses a resistive film and a stylus connected to a current source for locating a stylus by current measurement. A preferred embodiment of a voltage digitizer design which uses a polyvinylidene difluoride (KYNAR) film coated with a conductive resistive coating so that the transient voltage between the coating on the upper and lower surfaces of the PVDF piezoelectric film can be measured. A resistive element forming a voltage divider is provided between resistance films leads at each corner with the film resistance.

5 Claims, 1 Drawing Sheet

TABLET DIGITIZER WITH UNTETHERED STYLUS

FIELD OF THE INVENTION

This invention relates to digitizers which can be used as a substitute for a mouse, for a tablet, or for larger units such as demonstration boards, in which the stylus which is used for digitization is untethered to anything.

BACKGROUND OF THE INVENTION

There are many forms of tablet digitizers, but these digitizers traditionally have a tether which couples the stylus to the system, are not cost effective or have other disadvantages.

There are pressure-sensitive input apparatus proposals, such as that disclosed by U.S. Pat. No. 4,929,934 issued May 29, 1990 to Ueda et al, where there are disposed a complex array of x and y coordinate resistive members connected to mutually parallel electrodes for detecting a point depressed by a stylus or finger U.S. Pat. No. 4,934,470 disclosed a data input board for detecting of coordinates of a writing tip which included a rigid and an elastic plate with electrically conductive surfaces Another x-y coordinate system is illustrated by the electrographic touch sensor of U.S. Pat. No. 4,731,508 issued Mar. 15, 1988 to Gibson et al. Some have proposed a cordless pen which would emit a directional electric field from the tip of a pen stylus which is capacitively coupled to an embedded X and Y coordinate system in a digitizer tablet which is scanned by a microprocessor, such as that shown by U.S. Pat. No. 4,672,154 issued June 9, 1987 to Rodgers et al., a system similar to the coordinate coil stylus system of U.S. Pat. No. 3,904,822 of Sept. 9, 1975 to Kamm et al.

Also in the keyboard art, piezoelectric polymer keyboards have been formed which are non-contact. These include U.S. Pat. No. 4,633,123 issued Dec. 30, 1986 to Peter F. Radice, where a piezoelectric PVDF film is adhered to a pair of electrically insulating substrates having rows and columns to form a switch.

Position detectors in the form of infrared and ultrasound transducers have been used to detect position, such as those described in U.S. Pat. No. 4,758,691 issued July 19, 1988 to De Bruyne. De Bruyne suggests that the fixed electrode of the ultrasound transducer can be used as a digitizer. He claims a fixed electrode formed by PVDF plastic foil which is metallized on its inner surface.

In addition, representative of those systems with a wired stylus are U.S. Pat. Nos. 3,591,718 issued July 21 6, 1968 to Assano et al; 4,806,918 issued Feb. 21, 1989 to Berke et al; 4,818,826 issued Apr. 4, 1989 to Kimura et al; 4,752,655 issued June 21, 1988 to Tajiri et al; and 4,947,156 issued Aug. 7, 1990 to Sata et al.

Also illustrative of the state of the art are the following IBM Technical Disclosure Bulletins: Check Pad for Personal Computer, Vol 30, No. 3, Aug. 1987; Personal Identification Terminal, Vol 31, No. 7, Dec. 1988; Pressure Sensitive Cursor Control Keypads, Vol. 31, No. 12, May 1989; Cursor Controller/Graphics Pad, Vol 28, No. 9, February 1986; Manual Character Entry Devices, Vol. 19 No. 6, Nov. 1976 ; Three-axis Touch Sensitive Pad, Vol. 29, No. 8, Jan. 1987.

SUMMARY OF THE INVENTION

The present inventions relate to a tablet digitizer which can be used with an untethered stylus which may be as simple as a pencil or felt tip pin. The tablet can be covered with a sheet of film or paper and a drawing corresponding to the actual drawing by the stylus can be created, outputted to a printed sheet or a facsimile after digitization, via a microprocessor. Furthermore, the actual drawing surface can be a thin protective film for increased durability, as the invention does not require electrical contact between the stylus instrument and the top conductive surface.

In accordance with our invention we provide a deformable film digitizer with a four corner voltage measurement circuit which measures the relative voltage that the deformable piezoelectric film generates as it deforms. A ratio measurement of these voltage locates the measurements gradient, and locates the stylus within whatever x-y grid is being used for the digitization. The ratio measurement also allows for the rejection of common mode electrical interference that may be intercepted by the structure acting as an antenna.

The system is economical to manufacture and does not use a resistive film and stylus which is connected to a current source, of the kind illustrated by FIG. 1, and U.S. Pat. No. 4,929,934 discussed above.

Further the gradient measurement allows the stylus to be located with a relative position rather than a fixed point location, allowing a contact which is maintained to be drawing with a located smooth line, rather than having the digitizer have to calculate an anti-aliasing smoothed line position.

The digitizer tablet in accordance with the invention uses a piezoelectric plastic material which generates a voltage when deformed. The preferred plastic is polyvinylidene diflouride (PVDF). PDVF is discussed in "Fantastic Plastic", SCIENCE NEWS, Vol. 136, Nov. 28, 1989 pp 328, 329.

The inventions will be described in detail with respect to the following drawings in which:

FIG. 1 is a schematic representation of a digitizing tablet typical of commercially used devices which use a tethered stylus connected to a current source; and FIG. 2 illustrates the preferred embodiment of our invention.

DETAILED DESCRIPTION

Figure 1:
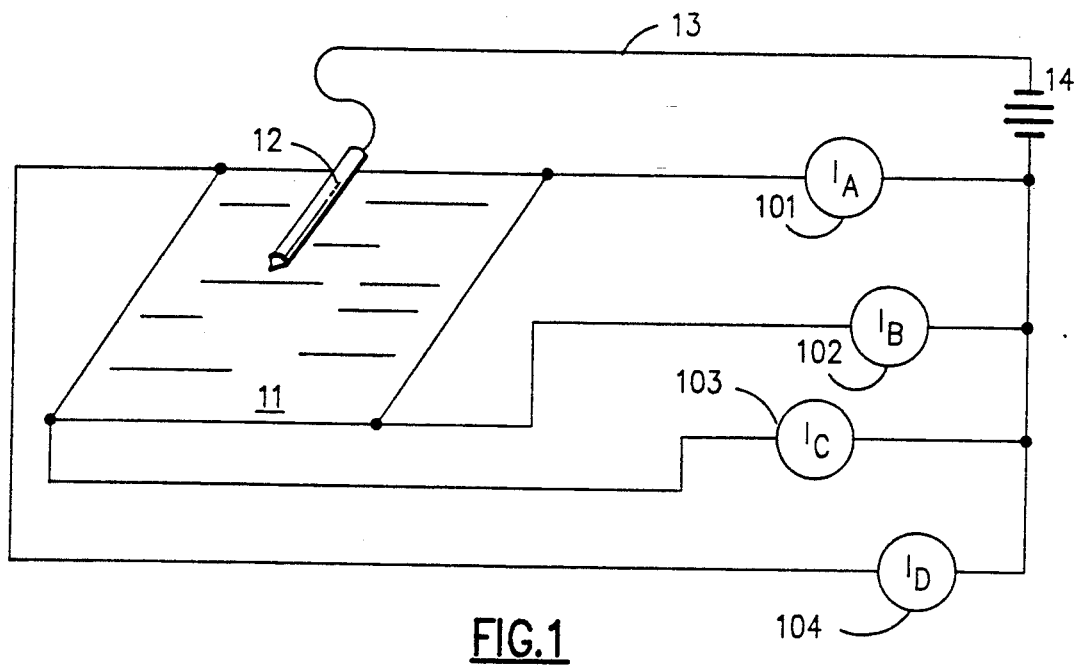

Turning now to the drawings in greater detail, it will be seen that FIG. 1 illustrates a current digitizer design which utilizes a resistive transparent film, such as Mylar, a trademark of Dupont, and a stylus connected to a current source. The resistive film 11 is coupled to a current measurement device 101, 102, 103, 104 at the four corners of the resistive film 11. A stylus 12 coupled via a tether 13 to a voltage source 14 is coupled to the four current measurement devices.

Figure 2:
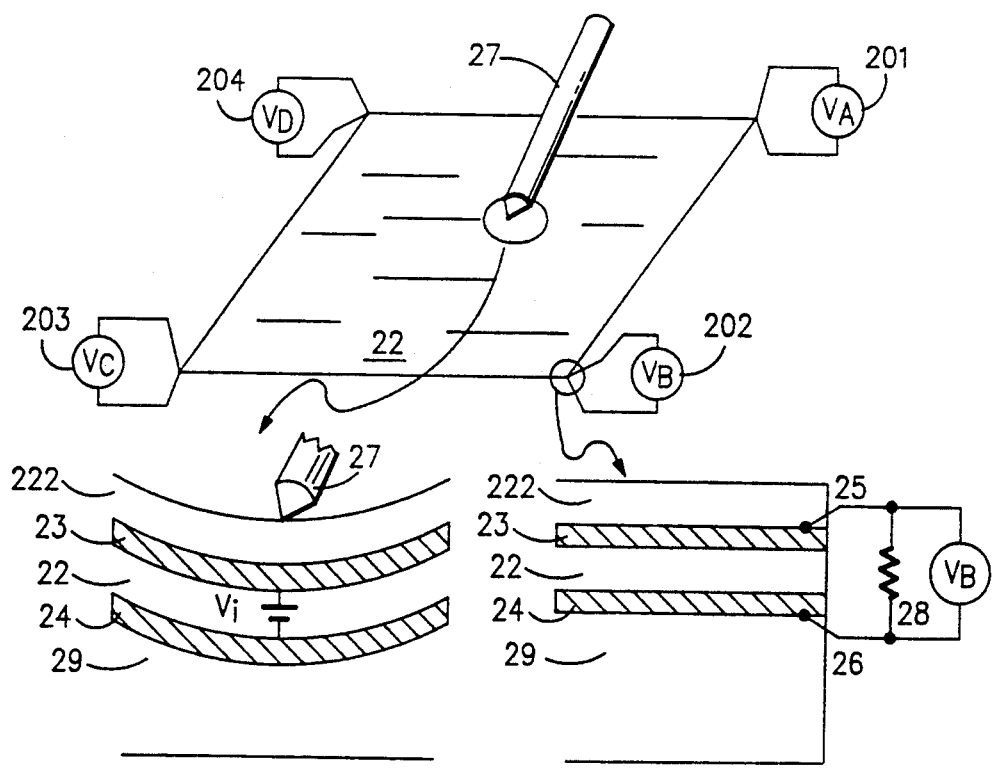

As illustrated by FIG. 2, the preferred embodiment of the invention is similar to the above figure, but uses a piezoelectric film made from polyvinylidene diflouride (PVDF), and sold under the trademark KYNAR by the Pennwalt Corp. in Valley Forge, Pennsylvania. This plastic material generates a voltage when it is deformed. The piexoelectric film is produced by stretching PVDF and subjecting it to a strong electric field.

The piezoelectric film 22 is used as a source of electric potential with voltage measurement devices 201, 202, 203 and 204 connected to the film at its corners. Preferably four corners are used and the film has a measured size, so that a coordinate system is established which is related to the film itself.

Both the upper and lower surface is coated with vapor sputtering with a thin resistive film 23, 24 layer. At each of the corners an upper 25 and lower 26 lead is connected to the upper 23 and lower 24 resistive film surfaces, respectively. A load resistor 28 is placed between leads 25 and 26 at each corner. The voltage across the PVDF KYNAR film is measured by the measurement device connected to leads 25 and 26 at each corner of the film.

A stylus 27, such as a pencil or felt pen, or a writing or pointing instrument, is pressed against the film. The voltage Vi across the film is transient due to deformation under the pressure of the stylus 27. The stylus is freely positioned and not tethered.

The deformation region size is controlled by the elastic properties of the deformable layer 29. The deformation of the piezoelectric layer generates a voltage that encounters varying resistance to the leads at the four corners. A resistance load 28, between the two leads 25 and 26 at each of the four corners is adjustable or adjusted to the environment for useable sensitivity since it forms a voltage divider with film resistance.

The unique location of the stylus at any instant is determined, by the ratios of the measured voltages at the corners across the voltage dividers. It is independent of the absolute voltage generated. It is insensitive to the finite size of the voltage generation point as well.

Accordingly, the coordinate system provided by the system is scalable, and may be ranged between various possible coordinate digital dimensions. The invention has the further advantage of permitting a protective layer 222, (a paper or film) over the resistive film for longer life than was possible with the Prior Art system illustrated by FIG. 1. The protective film may be deformable film, and pressure of writing or drawing on the protective film (which may be then later be wiped clean with an eraser) permits drawings to be digitized, scaled to a desired coordinate system, and outputted to a digital or analog printer or tracking printing stylus to which the output is coupled by known means. On the contrary, the Prior Art system using resistive films must be contacted with the stylus, making them susceptible to damage and wear. Furthermore, the resistive film often must be transparent to view a screen through it. This implies that the resistive film subjected to the environment and stylus wear must be very thin and that much more easily damaged.

The voltage ratio comparison circuits may be analog or digital. For this purpose, we prefer the voltage inputs to be provided to a microprocessor via an analog to digital converter. Various boards are available from Burr Brown or other vendors which provide for multiple A/C converter inputs to a microprocessor.

A useful application of our inventions is in the hospital operating room environment where the oxygen in the environment makes for a possible hazard. With the use of a non-tethered and field free stylus small electrical potentials do not exist, and the dangers for electrical sparks from this writing surface is eliminated. Electrical shock hazard around open wounds is also eliminated.

It will be appreciated that having disclosed our preferred embodiment of our invention, various modifications and improvements will occur to those skilled in the art both now and in the future. Such improvements and modifications should be interpreted to protect our rightfully claimed inventions.

What is claimed is:

1. A digitizing tablet for use with an unattached stylus instrument, comprising
   a piezoelectric film membrane having corners,
   said piezoelectric film membrane having a resistive conductive and resistive film coating on its upper and lower surface,
   the upper and lower surface each having separate conductive leads connected to the upper and lower surfaces respectively at each corner of the film membrane,
   each corner upper and lower leads being coupled via a resistance coupling in the form of a voltage divider,
   voltage measurement means being coupled to the upper and lower leads at each corner,
   said piezoelectric film membrane being deformable and having the property that when subjected to deformation that the film generates a voltage that encounters a varying resistance to leads at the corners of the film membrane depending on its location from these corners,
   comparison means for comparing the ratios of the voltages detected at each corner of the film for determining the relative coordinates of a pressure point provided by a stylus pressed against said piezoelectric film membrane.

2. A digitizer tablet according to claim 1 wherein said piezoelectric film is formed of polyvinylidene difluoride.

3. A digitizer tablet according to claim 1 wherein said piezoelectric film has four corners and wherein each corner has at the upper and lower surface of each corner separate conductive leads connected to the upper and lower surfaces respectively of the film membrane,
   each corner upper and lower leads being coupled via a resistance coupling in the form of a voltage divider,
   and voltage measurement means being coupled to the upper and lower leads at each of the four corners.

4. A digitizer tablet according to claim 1 wherein the the output of the comparison means is scalable such that a digitized coordinate system provided with the results of the comparison means position information is freely scalable without the need for anti-aliasing the results between coordinate points.

5. A digitizer tablet according to claim 1 having a protective layer over a resistive film, said protective layer being adapted to deform along with said resistive film.

* * * * *